United States Patent [19]

Hanson et al.

[11] 4,289,967

[45] Sep. 15, 1981

[54] MULTIANODE CYLINDRICAL PROPORTIONAL COUNTER FOR HIGH COUNT RATES

[75] Inventors: James A. Hanson, Madison, Wis.; Manfred K. Kopp, Oak Ridge, Tenn.

[73] Assignee: The United States of America as represented by the United States Department of Energy, Washington, D.C.

[21] Appl. No.: 152,954

[22] Filed: May 23, 1980

[51] Int. Cl.³ .................... G01T 1/18

[52] U.S. Cl. .................... 250/385; 313/93; 313/192; 313/307

[58] Field of Search .................... 250/374, 375, 385; 313/93, 188, 192, 217, 306, 307

[56] References Cited

U.S. PATENT DOCUMENTS

| | | | |
|---|---|---|---|
| 3,230,372 | 1/1966 | Spacklen | 250/385 |
| 3,935,464 | 1/1976 | Zingaro | 250/385 |
| 4,197,462 | 4/1980 | Kopp | 250/474 |

*Primary Examiner*—Davis L. Willis

*Attorney, Agent, or Firm*—David E. Breeden; Stephen D. Hamel; Richard G. Besha

[57] ABSTRACT

A cylindrical, multiple-anode proportional counter is provided for counting of low-energy photons (<60 keV) at count rates of greater than $10^5$ counts/sec. A gas-filled proportional counter cylinder forming an outer cathode is provided with a central coaxially disposed inner cathode and a plurality of anode wires disposed in a cylindrical array in coaxial alignment with and between the inner and outer cathodes to form a virtual cylindrical anode coaxial with the inner and outer cathodes. The virtual cylindrical anode configuration improves the electron drift velocity by providing a more uniform field strength throughout the counter gas volume, thus decreasing the electron collection time following the detection of an ionizing event. This avoids pulse pile-up and coincidence losses at these high count rates. Conventional RC position encoding detection circuitry may be employed to extract the spatial information from the counter anodes.

10 Claims, 4 Drawing Figures

MULTIANODE CYLINDRICAL PROPORTIONAL COUNTER FOR HIGH COUNT RATES

BACKGROUND OF THE INVENTION

This invention relates generally to proportional counter-type radiation detectors and more particularly to a proportional counter tube configuration for improvements in counting of low-energy photons (<100 keV) at high count rates. The invention is a result of a contract with the U.S. Department of Energy.

In the field of radiation detection, cylindrical gas proportional counter tubes are used extensively due to their simplicity and rugged design. Proportional counter tubes are filled with a selected, ionizable gas for the efficient detection of charged particles, neutrons, and low-energy (<100 keV) X-rays. To minimize radiation attenuation to the structural medium, the counter-wall thickness and material are selected to be essentially transparent to the radiation or particles being detected. Additional advantages of proportional counters are: operation at room temperature, good energy resolution, excellent signal-to-noise ratios owing to gas multiplication, and large dimensions (several meters long).

In some applications, the count-rate capability of cylindrical proportional counters is limited by the diffusion of electrons drifting toward the anode from the point of an ionizing event within the detector gas volume. The size of the electron cloud owing to diffusion is proportional to the total drift time. The diffusion process causes the electrons from each detected event to arrive at the anode over an extended period of time, thus degrading the rise time of the avalanche pulse detected at the anode. This slow rise time limits the pass band of the signal processing circuitry and thereby the count-rate capability of the proportional counter. The problem is especially significant in large diameter proportional counters (>50 mm), at high gas pressures (20 atm). These parameters are required for detecting low energy photons (<100 keV) with adequate detection efficiency (>50%) at low operating voltages (<5 kv).

The detection of these low energy photons at high count rates ($>10^5$ counts/sec) cannot be achieved with adequate detection efficiency in a conventional (coaxial) proportional counter tube unless the gas pressure is increased to increase the detection efficiency. For the hich count-rate operation, high drift velocity must be obtained throughout the whole gas volume, requiring impractically large anode diameters and high bias voltages. For example, the electron drift velocity for a 97% Xe-3% $CO_2$ gas mixture is approximately 2 cm/μsec. for a field strength-to-pressure ratio (E/p)>4 mv(cm Pa)$^{-1}$. With the conventional, coaxial anode-cathode configuration, it is difficult to maintain E/p>4 mv(cm Pa)$^{-1}$ throughout the counter volume unless a large anode diameter is used. This in turn requires impractically high operating bias voltages and extreme smoothness of the anode surface. The bias voltage must be high to produce adequate gas multiplication. The anode surface must be smooth in order to prevent counter breakdown caused by corona discharges from sharp points on the anode surface.

The present invention mitigates these problems because the multianode cage acts as a large diameter, virtual anode. The value of E/p is maintained at >4 mv(cm Pa)$^{-1}$ anywhere between the cathode cylinders and this cage, with reasonable bias voltage (<5 kv). Adequate gas multiplication is obtained owing to the high value of E/p in the vicinity of the individual anode wires. High count-rate capability and good detection efficiency for approximately 100 keV photons are needed in biomedical applications (e.g., low-dose transmission and emission radiography).

SUMMARY OF THE INVENTION

It is an object of this invention to provide a proportional counter tube with increased ionizing radiation detection efficiency for low energy photons.

Another object of this invention is to provide a proportional counter as in the above object in which the electron collection time following a detected ionizing event is much shorter than in a conventional proportional counter, thus improving the event counting rate.

Further, it is an object of this invention to provide a proportional counter as in the above objects in which the electrostatic field is more evenly distributed within the counter-sensitive volume for reducing the collection time of electrons originating anywhere in the cylindrical proportional counter tube.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the proportional counter tube of this invention may comprise a cylindrical housing forming an outer cathode electrode; a cylindrical inner cathode electrode disposed coaxially within the housing; a plurality of uniformly spaced-apart anode electrodes disposed intermediate said inner and outer cathodes and parallel to the longitudinal axis of the cathodes; an ionizable gas filling the volume within the housing and means for applying a bias voltage between the outer cathode and the plurality of anodes and the inner cathode and the plurality of anodes so that a uniform electrostatic field is provided within the ionizable gas volume thereby minimizing the electron collection time at the anodes following an ionizing event within the gas volume.

Preferably, the plurality of anodes are disposed within the counter tube in a uniformly spaced-apart cylindrical array at constant radius locations about the inner cathode to form a virtual cylindrical anode.

Further, the anodes may be connected commonly to a single RC encoding circuit.

Alternatively, the anodes may be connected to separate RC encoding circuits for highest count-rate applications.

BRIEF DESCRIPTION OF THE DRAWINGS

The accompanying drawings, which are incorporated in and form a part of the specification, illustrate the present invention and, together with the description, serve to explain the principles of the invention. In the drawings.

DETAILED DESCRIPTION

The invention will be described in its application for a position-sensitive, cylindrical proportional counter. It will be obvious that this counter tube may be used equally as well in non-position sensing applications in which the location of the event along the axis of the counter is not of interest. The advantages of the faster counting rate are equally applicable in either counting application.

Figure 1:
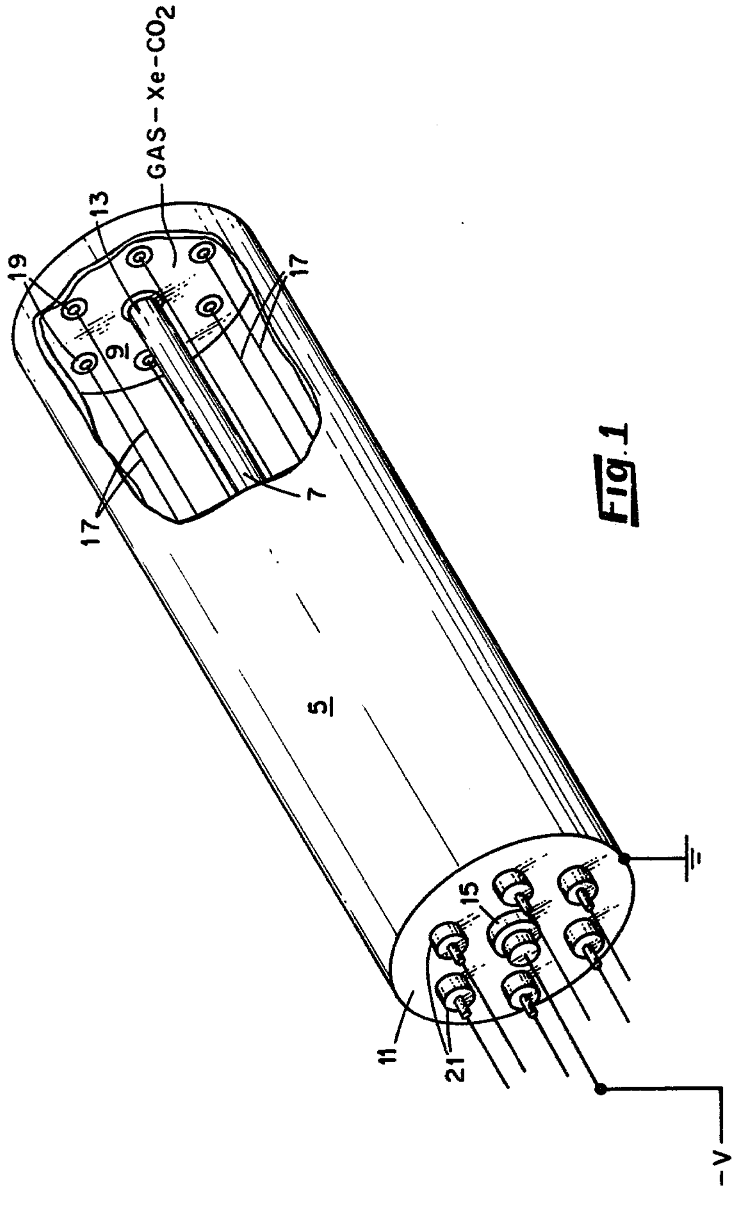
FIG. 1 is a perspective view partially cut away of a cylindrical proportional counter made in accordance with the present invention which includes six anode wires.

Referring now to FIG. 1, a cylindrical, electrically conductive housing 5 forms an outer cathode electrode and containment for an ionizable gas filling the volume thereof. As is well known in the proportional counter art, various ionizable gas mixtures may be used at various pressures depending on the type of ionizable radiation to be detected. The cylinder 5 may be constructed of aluminum to minimize shielding of the radiation to be detected by the ionizable gas medium. A coaxial inner cathode 7 is mounted at its ends in the center of the end closures 9 and 11 of the outer cathode housing 5 by means of ceramic insulators 13 and 15, respectively. The inner cathode may be formed from a solid rod or tube of aluminum. The insulators may be sealably mounted in the end closures by means of an epoxy cement to form a gas-tight seal for containment of the gas within the counter housing 5.

A large diameter virtual anode is formed which is coaxial with the cathodes by mounting a plurality of wires 17 in the area between the inner and outer cathodes. Each anode wire 17 is mounted between the end closures 13 and 15 by means of ceramic insulators 19 and 21, respectively. The anode wires are equally spaced apart at constant radius locations from the inner cathode 7 surface to form the cylindrical anode cage. The anode may be formed by tightly strung, 25 micron diameter, stainless steel wires. The anode wire insulators are sealed and held in place by means of epoxy cement.

The outer cathode or housing 5 is connected to ground potential and the inner cathode 7 is connected to an appropriate negative voltage source (−V). Depending upon the application, the anodes may be either connected in common to an appropriate positive DC voltage source (+V) via the large resistor 46 (approximately 50 MΩ) as shown in FIG. 2 for low count-rate applications, or for high count-rate applications each anode may be connected individually to the common +V via a large resistor 46 (approximately 50 MΩ).

Figure 2:
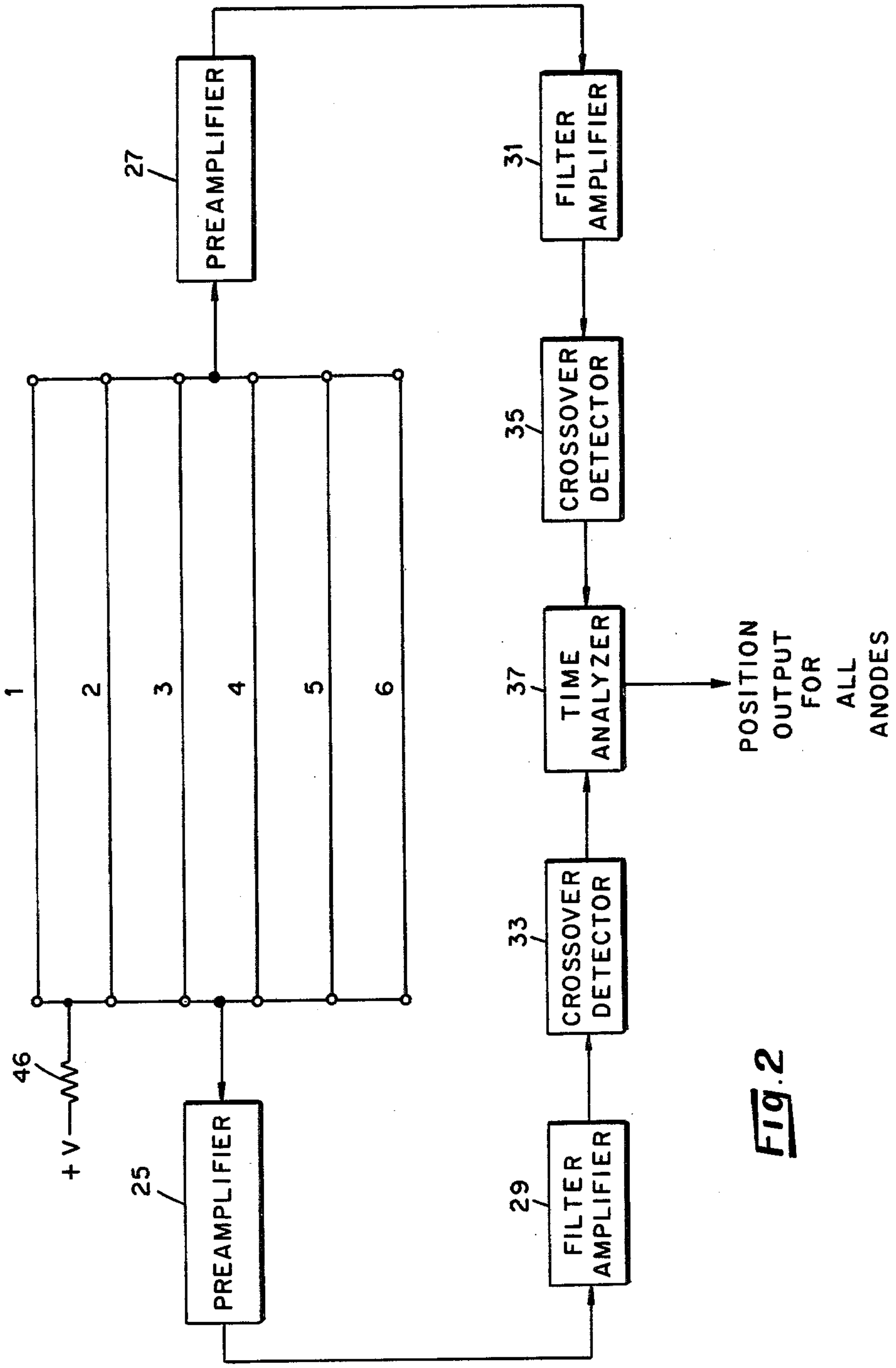
FIG. 2 is a schematic diagram of a common anode connection RC encoding circuit for the position-sensitive proportional counter of FIG. 1, applicable for count rates less than $10^5$ counts/sec.

Referring now to FIG. 2, there is shown the common anode connection for low count-rate applications. The separate ends of the six anode wires are connected in common to the inputs of preamplifiers 25 and 27, respectively. The preamplifiers are active-capacitance preamplifiers which are used to terminate the anode ends so that the anode is treated as an RC line. These preamplifiers act as stabilized active capacitance loads and each is composed of a series feedback, low-noise amplifier and a unity-gain, shunt-feedback amplifier connected to the input of the series feedback amplifier through a series feedback amplifier. The stabilized capacitance loading of the anodes allows distributed RC-line event position encoding and subsequent time difference decoding by sensing the differences in rise times of pulses at the anode ends. Thus, the outputs of amplifiers 25 and 27 are connected, respectively, to the inputs of pulse-shaping filter amplifiers 29 and 31. The filter amplifiers produce bipolar pulses at their respective outputs which have zero base line crossover times corresponding to the rise times of the respective input pulses. These crossover times are detected by crossover detectors 33 and 35 connected to the outputs of filter amplifiers 29 and 31, respectively. The crossover detectors generate pulses coincident with the bipolar pulse crossover time. These pulses are applied to the start and stop inputs of a time analyzer circuit 37 which may be a conventional time-to-amplitude converter. The times between the respective zero crossings of the bipolar pulses generated from the rise time of the respective anode end pulse are indicative of the position of a detected event along the length of the proportional counter. Additional details of the RC encoding circuit for position-sensitive proportional counters may be had by referring to U.S. Application Ser. No. 966,525, filed Dec. 4, 1978, now U.S. Pat. No. 4,197,462, by Manfred K. Kopp for "Position-Sensitive Proportional Counter with Low-Resistance Metal-Wire Anode" and having a common assignee with the present invention.

The position output signal from the time analyzer circuit 37 may be recorded in various conventional ways so that the amplitude of the signal is indicative of the position of a detected event along the counter anodes.

Figure 3:
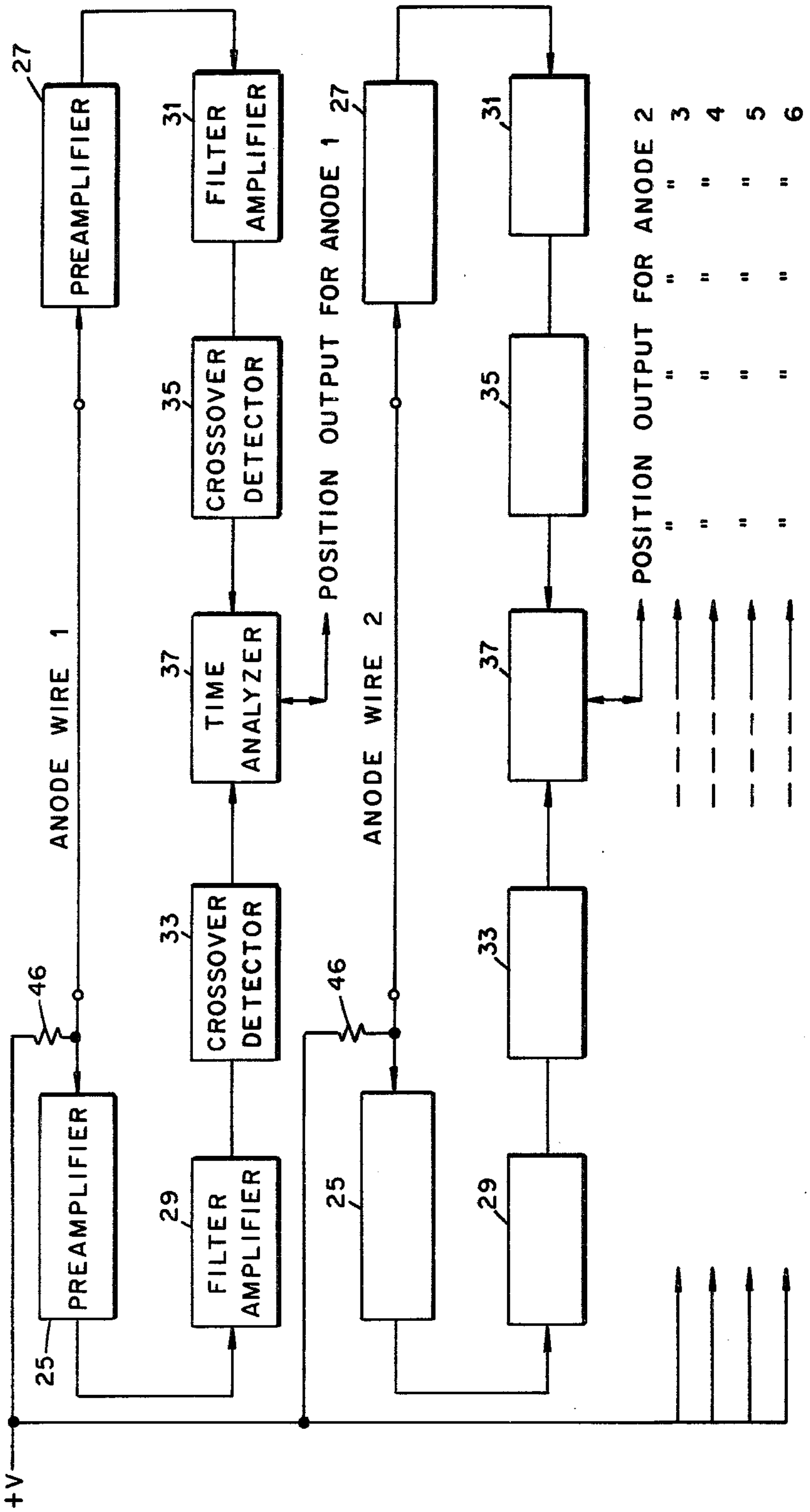
FIG. 3 is a circuit diagram illustrating separate anode connected RC encoding circuits for the position-sensitive proportional counter of FIG. 1, applicable for count rates greater than $10^5$ counts/sec.

Referring now to FIG. 3, there is shown a connection scheme for RC encoding of the position information from each of the anodes individually. Each individual encoding circuit is identical in components and function to the single circuit shown in FIG. 2 and the identical parts are indicated by like reference numerals. This embodiment is useful for spatial detection of ionizing radiation events at count rates greater than $10^5$ counts per second.

The number of anode wires may vary depending upon the particular diameter of the detector, which in turn depends on the energy of the radiation to be measured and the gas composition and pressure. As a general rule of thumb the anode cage diameter is approximately ½ of the outer cathode inner diameter, and the distance between adjacent anode wires is approximately 1.5 cm. For example, for an outer cathode diameter D(cm) the anode cage diameter is approximately 0.5 D(cm) and the number of anode wires required is $N \simeq 0.5\ D\pi/1.5\ cm \simeq D$. Thus, for a 6 cm-diameter outer cathode $N=6$ wires.

Figure 4:
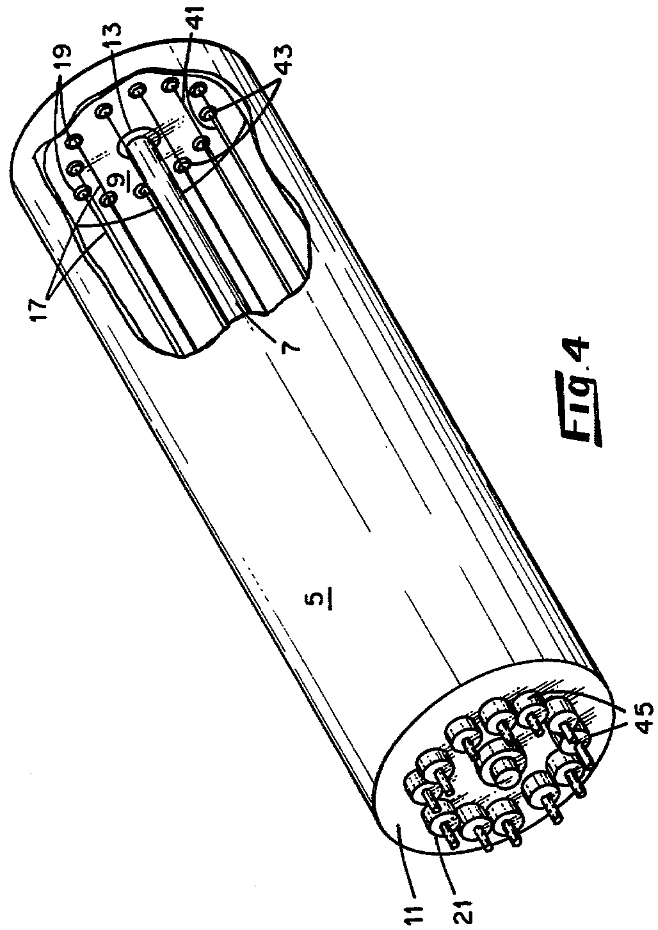
FIG. 4 is a perspective view partially cut away of an alternate embodiment of the cylindrical proportional counter of FIG. 1 in which auxiliary cathode wires are introduced between the anode wires to further increase the electrostatic field strength in the areas between the anodes.

A position-sensitive proportional counter (PSPC) with a 2.7 cm-diameter equivalent anode cylinder, a 5.5 cm-diameter outer cathode cylinder and a 0.6 cm-diameter inner cathode was designed to operate at moderate bias voltages (<10 kv) to reach a desired E/p ratio of >4 mv(cm Pa)$^{-1}$ in >90% of the PSPC volume. This counter was designed to detect 60 keV photons. Six 25-μ-diameter anode wires were used to form the 2.7 cm-diameter cylindrical cage. With the anode wires at +7000 v, the inner cathode at −2000 v, and the outer cathode at ground potential, the E/p ratio is >4 mv(cm Pa)$^{-1}$ throughout the PSPC except in the small regions between the anode wires of the virtual anode. These low field regions may be eliminated by properly biased auxilliary cathode wires added at the low field points between each anode wire as shown in the embodiment of FIG. 4.

The auxiliary cathodes may comprise stainless steel wires 41 strung in the same manner as the anode wires 17 by means of sealed insulators 43 and 45 in the end closures 9 and 11, respectively. Typically, these auxiliary cathodes are 100-μ-diameter stainless steel wires biased at a voltage of +1 kv for an application as in the above-described design example. The remaining parts of the counter in FIG. 4 are identical to correspondingly numbered parts of the counter of FIG. 1.

The six-anode PSPC was tested with a 97% Xe-3% $CO_2$ gas mixture at $3\times10^5$ Pa. The anode wires were operated either as six independent RC-line-encoded PSPC's for high count-rate applications ($6\times10^5$ counts/sec) or as one PSPC with all anode wires connected in parallel for lower count-rate applications ($<10^5$ counts/sec). For both operational modes, the rise time of pulses from 60 keV photons was <100 ns, which is approximately 5 times shorter than the rise time of 60 keV photon pulses from a single, coaxial anode PSPC of similar dimensions. The coincidence losses of the multianode PSPC (all anode wires connected in parallel) were approximately 3% at a count rate of $10^5$ counts/sec.

Thus it will be seen that this counter has the following advantages over conventional single cathode and single coaxial anode PSPC's:

1. Increased count-rate capability by the decrease in rise time of the avalanche pulse formed at the collecting anode;
2. Reduction of the space charge related loss of energy resolution because the charge is distributed over more than one anode; and
3. Further increase in count rate capability when the signal processing electronics limits the count rate by using each anode as an independent proportional counter with its own signal processing circuit.

The foregoing description of the preferred embodiments of the invention have been presented for purposes of illustration and description. They are not intended to be exhaustive or to limit the invention to the precise form disclosed, and obviously many modifications and variations are possible in light of the above teachings. For example, the counter may be used with different pulse detector circuits connected only at one end of the anodes in common or separately for non-spatial detection applications to provide increased pulse count rate capability. The chosen embodiment was described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A proportional counter tube for detecting ionizing radiation comprizing:

a closed cylindrical housing forming an outer cathode electrode;

a cylindrical inner cathode electrode disposed coaxially within said housing and spaced from the cylinder wall of said housing to form a detection volume between said inner and outer cathodes, a plurality of uniformly spaced-apart anode electrodes disposed intermediate said inner and outer cathodes and parallel to the longitudinal axis of said cathodes;

an ionizable gas filling said detection volume within said housing; and means for applying bias voltages between said outer cathodes and said plurality of anodes and said inner cathode and said plurality of anodes so that a uniform electrostatic field is provided within said detection volume thereby minimizing the electron collection time at said anodes following ionizing events within said gas filling said detection volume.

2. The proportional counter tube as set forth in claim 1 wherein said plurality of anodes includes a plurality of individual collector wires disposed in a uniformly spaced-apart cylindrical array at constant radius located about said inner cathode to form a virtual cylindrical anode.

3. The proportional counter of claim 2 wherein said collector wires are formed of stainless steel insulatably mounted at their respective ends in the corresponding end closures of said cylindrical housing.

4. The proportional counter of claim 2 wherein said counter is a position sensitive proportional counter and further including RC encoded pulse detection means coupled with said plurality of anodes for detecting and indicating the position of an ionizing event axially of said counter.

5. The proportional counter of claim 4 wherein said anodes are connected in common to an input of said pulse detection means.

6. The proportional counter of claim 5 wherein said anodes are connected individually to separate inputs of said detection means.

7. The proportional counter as set forth in claim 2 further including a plurality of auxiliary cathode electrodes disposed in an alternately interleaved cylindrical array with said plurality of anode wires, said cathode electrodes being electrically biased to maintain the uniformity of said electrostatic field between said anode wires.

8. The proportional counter as set forth in claim 7 wherein said auxiliary cathodes include stainless steel wires insulatably mounted at their respective ends in the corresponding end closures of said cylindrical housing.

9. The proportional counter as set forth in claim 2 wherein the diameter of said virtual cylindrical anode is approximately ½ the inner diameter (D) of said outer cathode.

10. The proportional counter as set forth in claim 9 wherein said plurality of anodes (N) is approximately equal to the numerical value of D, where D is specified in centimeters.

* * * * *